Figure 2A:
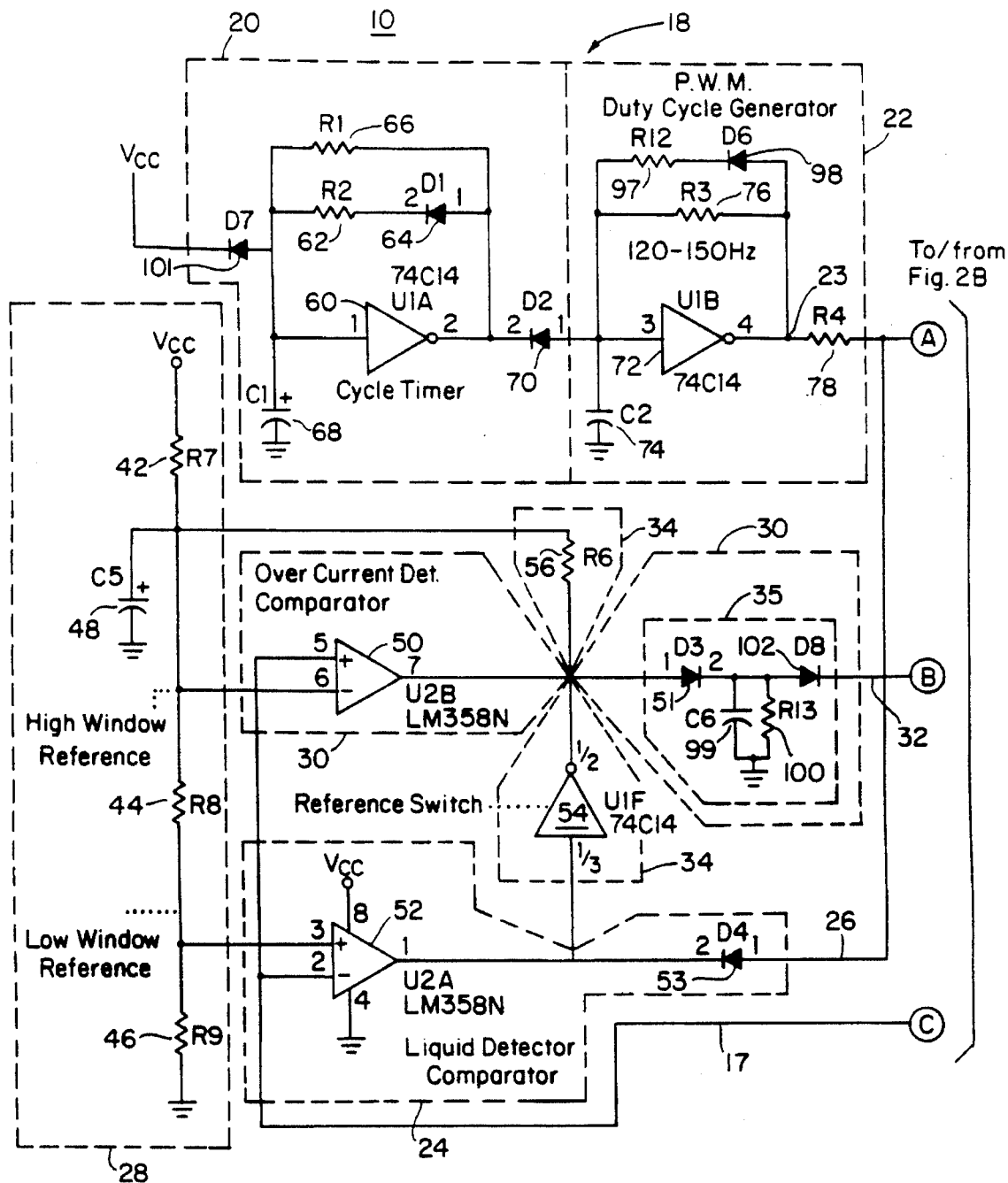

United States Patent
Anastos et al.

[11] Patent Number: 5,545,012
[45] Date of Patent: Aug. 13, 1996

[54] SOFT-START PUMP CONTROL SYSTEM

[75] Inventors: William N. Anastos, Belmont; Stephen B. Boyd, Newburyport, both of Mass.

[73] Assignee: Rule Industries, Inc., Burlington, Mass.

[21] Appl. No.: 204,193
[22] PCT Filed: Oct. 4, 1993
[86] PCT No.: PCT/US93/09415
  § 371 Date: Jan. 27, 1994
  § 102(e) Date: Jan. 27, 1994
[87] PCT Pub. No.: WO95/09981
  PCT Pub. Date: Apr. 13, 1995
[51] Int. Cl.[6] ................................ F04B 49/06
[52] U.S. Cl. .............. 417/44.11; 417/12; 417/44.1; 417/45; 417/423.3; 318/484
[58] Field of Search .......... 417/12, 44.1, 44.11, 417/45, 423.3; 307/118, 135, 141; 361/28, 29, 31; 318/431, 482, 484; 388/811

[56] References Cited

U.S. PATENT DOCUMENTS

| | | | |
|---|---|---|---|
| 3,953,777 | 4/1976 | McKee | 318/474 |
| 4,420,787 | 12/1983 | Tibbits et al. | 361/79 |
| 4,473,338 | 9/1984 | Garmong | 417/12 |
| 4,628,235 | 12/1986 | Goings | 318/430 |
| 4,999,556 | 3/1991 | Masters | 318/599 |
| 5,076,763 | 12/1991 | Anastos et al. | 417/44 |
| 5,234,319 | 8/1993 | Wilder | 417/45 |
| 5,324,170 | 6/1994 | Anastos et al. | 417/12 |

*Primary Examiner*—Richard A. Berisch
*Assistant Examiner*—Xuan M. Thai

[57] ABSTRACT

A soft-start pump controller system for controlling a pump motor includes a switching device for supplying power to the pump motor; a periodic duty cycle generator for periodically actuating the switching device at a fraction of the full duty cycle to operate the pump at a reduced, quieter level; a sensor for sensing the current drawn by the pump motor; a reference circuit; and a liquid detector for detecting the presence of the liquid to be pumped, responsive to the sensor and the reference circuit, for overriding the periodic duty cycle generator and actuating the switching device to operate the pump motor continuously at full power when the motor current exceeds a predetermined level indicating liquid is present.

8 Claims, 3 Drawing Sheets

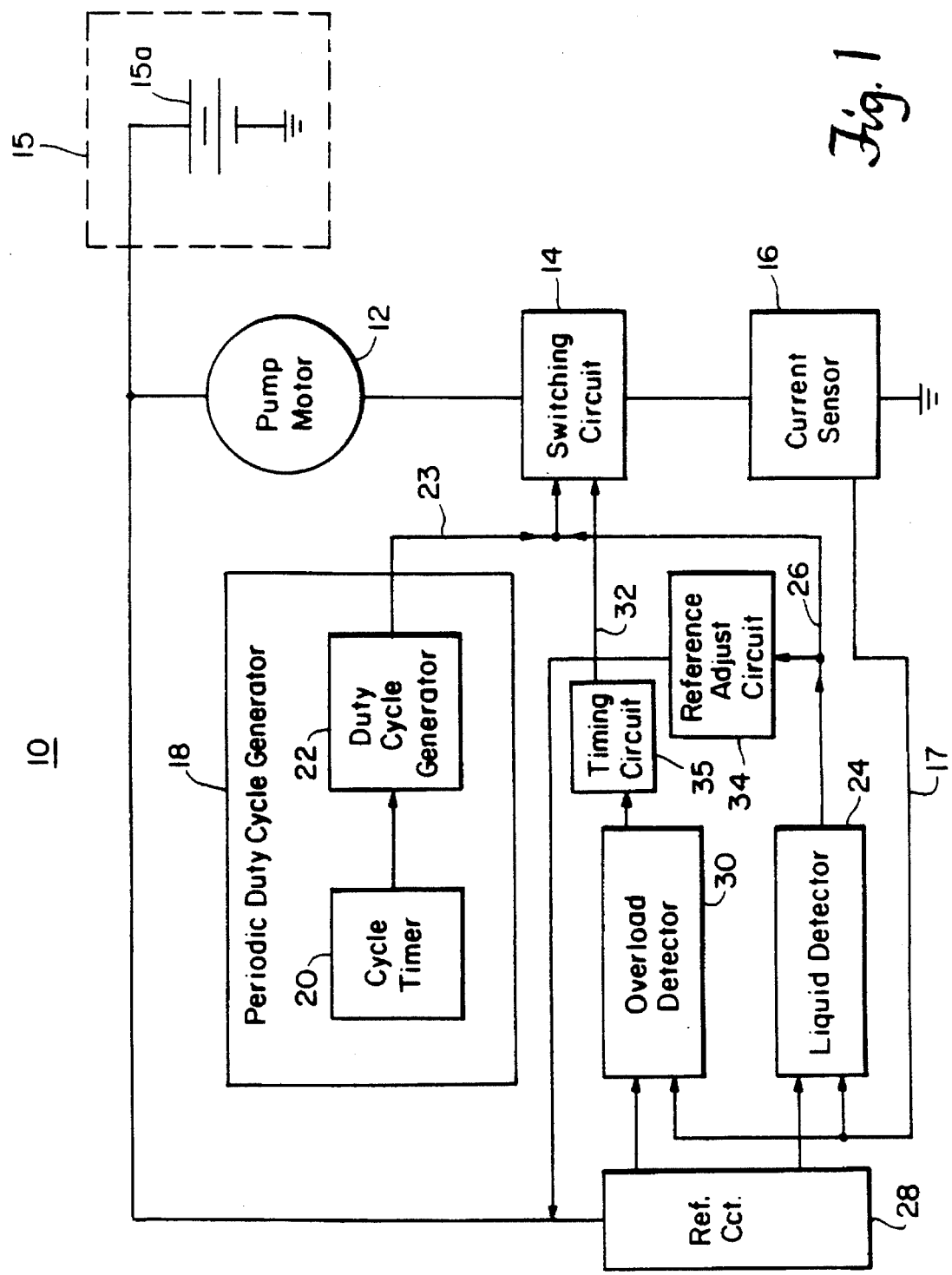

SOFT-START PUMP CONTROL SYSTEM

FIELD OF INVENTION

This invention relates to a soft-start pump control system for a pump motor which operates much more quietly and without the need for a float switch or other level sensing device.

BACKGROUND OF INVENTION

Bilge pumps, sump pumps and similar DC or AC electric powered pumps used to pump out accumulated water traditionally use a float switch for the pump power circuit in which the water level raises and lowers the float sufficiently to close and open the associated switch. Such float switch devices require a number of moving parts which wear or bind and eventually fail; and the wearing and binding is often accelerated by the damp, corrosive and dirty environment in which these float switches are used. Failure of the switch can have catastrophic effects since when the pump does not operate the water accumulates and can flood the area. In the case of bilge pumps, the flooding can sink the vessel.

One attempt to eliminate the need for such float switches includes means to periodically, automatically, e.g. every five minutes, turn the pump on whether or not there is water or liquid buildup. The pump current is then monitored, and, if it is low, a no-load condition is detected and the pump is shut off. If the current is normal, a load condition is detected and the pump is permitted to keep pumping until the water is drained and the low current condition reoccurs. See U.S. Pat. No. 5,076,763, "Pump Control Responsive to Timer, Delay Circuit and Motor Current", by the present inventors. While this solves the float switch problems, it adds another. Namely, in some installations the noise of the pump turning on every five minutes or for a similar time interval annoys owners and crew. For, even if no water is present the pump still relentlessly makes noise every five minutes.

SUMMARY OF INVENTION

It is therefore an object of this invention to provide an improved pump controller system.

It is a further object of this invention to provide such a pump controller system which is simple and reliable, even in dirty, contaminated, hostile environments.

It is a further object of this invention to provide such a pump controller system which operates periodically, automatically to eliminate the need for a float switch but which is quieter in operation.

It is a further object of this invention to provide such a pump controller system combined with a pump to make a smaller, more compact, easy to install unit.

This invention results from the realization that a truly effective pump motor for periodically yet quietly operating a pump can be effected by automatically energizing the pump motor at regular intervals but at reduced power by reducing the duty cycle while sensing the motor current and then stepping up the power if the motor current amplitude indicates that there is liquid to be pumped. The invention can be effectively applied to AC motor applications. In the same manner as DC motors, AC motors also exhibit higher levels of current draw when pumping liquids.

This invention features a soft-start pump controller system for controlling a pump motor, which includes switching mean for supplying power to the pump motor and a periodic duty cycle generator for periodically actuating the switching means at a fraction of the full duty cycle to operate the pump at a reduced, quieter level. There are sensor means for sensing the current drawn by the pump motor, a reference circuit, and a liquid detector for detecting the presence of the liquid to be pumped and responsive to the sensor means in the reference circuit for overriding the periodic duty cycle generator and actuating the switching mean to operate the pump motor continuously at full power when the motor current exceeds a predetermined level indicating liquid is present.

In a preferred embodiment the periodic duty cycle generator may include a duty cycle generator for providing a fractional duty cycle to the switching means and a cycle timer for periodically operating the duty cycle generator. The duty cycle generator may provide a 30% duty cycle. The liquid detector may include a comparator responsive to the reference circuit and to the sensor means. There may be an overload detector responsive to the sensor means and the reference circuit for overriding the periodic duty cycle generator and the liquid detector to actuate the switching means to deenergize the pump motor. The reference circuit may include a reference adjustment means responsive to the liquid detector for adjusting the reference level as a function of the current drawn by the pump motor under full power and at a fraction of the duty cycle.

DISCLOSURE OF PREFERRED EMBODIMENT

Figure 2B:
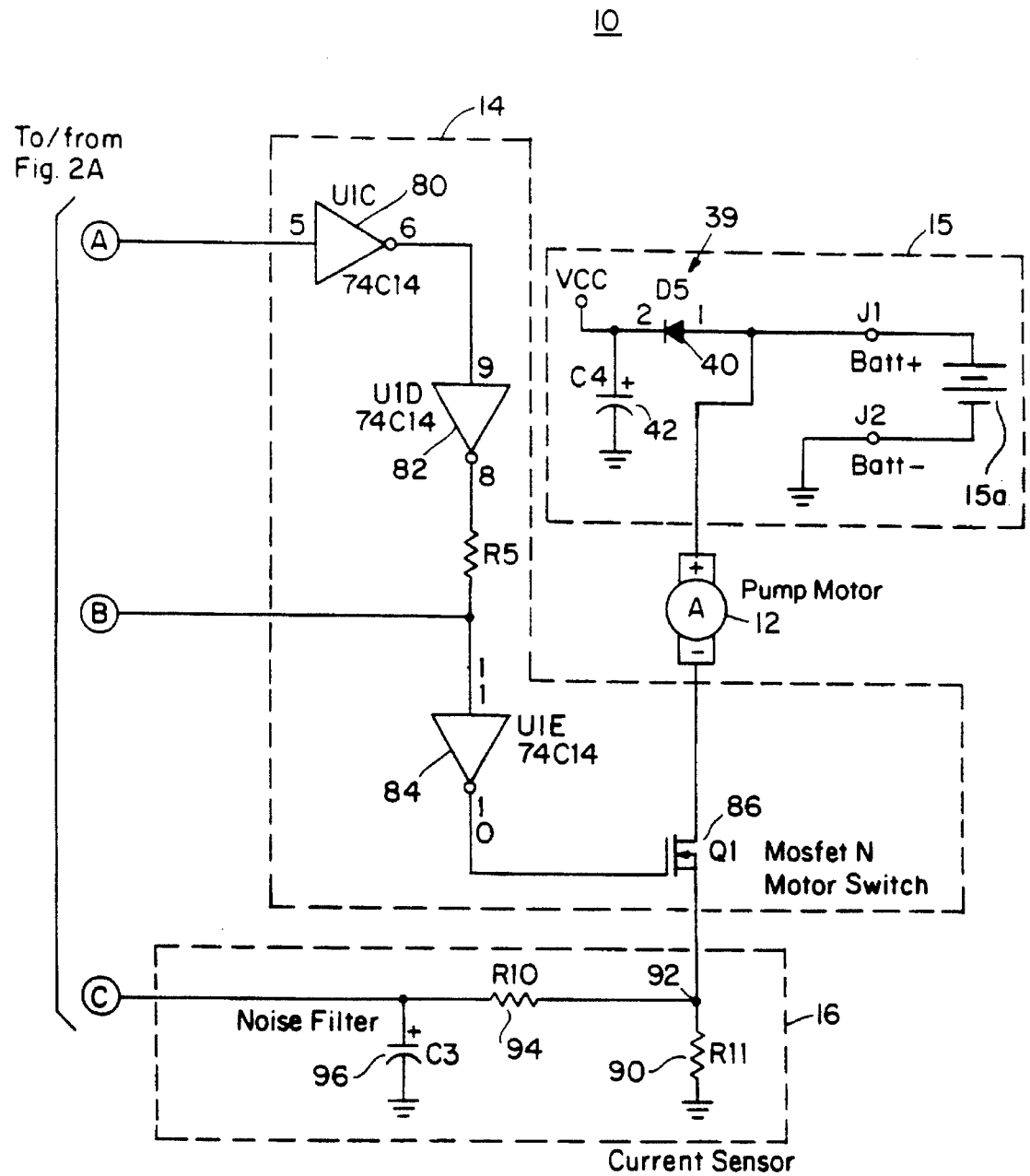

Other objects, features and advantages will occur to those skilled in the art from the following description of a preferred embodiment and the accompanying drawings, in which:

FIG. 1 is a block diagram of a soft-start pump controller system according to this invention; and FIGS. 2A and 2B are a more detailed schematic diagram of the system of FIG. 1.

There is shown in FIG. 1 a soft-start pump controller system 10 for controlling a pump motor 12 and switching circuit 14 which controls the power to pump motor 12 supplied from power supply 15 which may consist simply of battery 15a or may include a converter driven by an A.C. source. Current sensor 16 monitors the current flowing through pump motor 12 and provides an output on line 17. When the current flow is low, below a certain predetermined working or pumping level, then the pump motor is operating in a no-load condition and there is little or no liquid or water to be pumped. When the current sensor senses a current flow at the working level, then the pump motor is under a load condition and liquid, such as water, is present and therefore pumping is required.

Instead of a float switch which operates pump motor 12 only when the water or other liquid has reached a predetermined level, system 10 uses a periodic duty cycle generator 18 which includes a cycle timer 20 and a duty cycle generator 22. Cycle timer 20 actuates duty cycle generator periodically, for example every five minutes. Actually any desired period may be selected: less than one minute, one minute, two minutes; often a range of 1–3 minutes is satisfactory. At that time the duty cycle generator 22 delivers a signal on line 23 to operate switching circuit 14 to provide a fraction of the full power available to pump motor 12. This causes the pump motor to operate at a lower level and a much quieter level. If during that periodic low-power operation liquid detector 24 detects sufficient water or other liquid, necessitating the operation of pump motor 12, a signal is provided on line 26 to override the signal on line 23 and cause switching circuit 14 to provide power to pump motor 12 at the full available power. Liquid detector 24 responds to the output from current sensor 16 to provide the override signal on line 26 when the current reaches a predetermined level with respect to the reference circuit 28, indicating that there is sufficient water or other liquid accumulated and ready to be pumped. The second detector circuit, overload detector 30, also responds to the current detected by current sensor 16 and to reference circuit 28 to provide an output on line 32 when the current exceeds a predetermined level indicating that the pump motor is in an overload mode, i.e., the pump is jammed or for some other reason the pump motor is overloaded. The signal on line 32 then overrides either signal on line 23 or 26 and turns off switching circuit 14 so that no more power is provided to pump motor 12 which might otherwise be damaged by the overload condition. RC timing circuit 35 is included to extend the off signal on line 32 until the voltage on line 17 falls below the water detection reference voltage of liquid detector 24, preventing the circuit from oscillating. Timing circuit 35 also prevents oscillations during the time when duty cycle generator 18 is on and an otherwise periodic off signal would be on line 32.

Since the system can be operated at two power levels, the reduced power mode produced by duty cycle generator 22 and the full power mode produced by the signal from low liquid detector 24, which overrides the signal from duty cycle generator 22, some adjustment must be made to reference circuit 28. This is done by reference adjust circuit 34 which operates reference circuit 28 in the low power mode at all times except when liquid detector 24 determines that there is sufficient water or liquid present to operate pump motor 12 at full power. When this occurs, reference circuit 28 has its reference levels raised to coincide with the increased power being supplied to pump motor 12 as explained more fully below.

A more detailed schematic of the embodiment shown in FIG. 1 appears in FIGS. 2A and 2B, where power supply 15 includes battery 15a and a filtering network 39 including diode 40 and filter capacitor 42. The output $V_{cc}$ of the filtering network 39 is the input to reference circuit 28. Reference circuit 28 includes three resistors 42, 44 and 46, and a filter capacitor 48. Resistor 44 is the overload reference and resistor 46 is the liquid detector reference. Overload detector 30 includes comparator 50 and diode 51 while liquid detector 24 includes comparator 52 and diode 53. Reference adjust circuit 34 includes amplifier inverter 54 and resistor 56, which connects directly to reference circuit 28. Cycle timer 20 includes amplifier inverter 60 with a feedback loop including resistor 62 and diode 64, and a discharge path through resistor 66 for capacitor 68. Diode 101 acts as a power off reset to allow capacitor 68 to discharge when the power is removed. Diode 70 interconnects cycle timer 20 and duty cycle generator 22. Duty cycle generator 22 also includes an amplifier inverter 72, with a feedback loop including resistor 97 and diode 98 and a discharge path through resistor 76 for capacitor 74. The output of amplifier 72 is fed to line 23 through resistor 78 to line 26, which is connected to switching circuit 14. Switching circuit 14 includes three inverter amplifiers 80, 82 and 84, and a MOSFET power switch 86. Current sensor 16 includes resistor 90 which provides a voltage at point 92 that is a function of the current drawn through pump motor 12 and resistor 90. This voltage is delivered through a filter consisting of resistor 94 and capacitor 96 to the input of both liquid detector comparator 52 and the overload detector comparator 50.

Amplifier inverters U1A–U1F may be implemented with a Hex CMOS inverter chip, and the comparators U2A and U2B may be implemented with an LM358N operational amplifier, both made by National Semiconductor. Diodes D1–D5 may be 1N4148's, also made by National Semiconductor.

In operation, when the system is turned on, capacitor 68 is discharged and inverter amplifier 60 has a high output since it has a low input. Amplifier 60 feeds back current through diode 64 and resistor 62 to charge capacitor 68. During this time, while amplifier inverter 60 has a high output, diode 70 is back biased so that the input of inverter amplifier 72 in duty cycle generator 22 is low and its output is high. Thus amplifier 72 feeds back current through resistor 97 and diode 98 to charge capacitor 74 and begins oscillating, in this example, at 120–150 cycles per second. It will keep oscillating at this rate for approximately one second while capacitor 68 comes to a full charge. When that happens the high input to amplifier 60 causes a low output which stops the charging cycle and begins the discharging cycle whereby capacitor 68 discharges through resistor 66. This takes about five minutes. If during the time capacitor 68 is discharging power is removed, capacitor 68 can then discharge through diode 101. This allows the periodic duty cycle generator 18 to begin oscillations immediately upon power being reapplied and not having to wait five minutes for capacitor 68 to discharge through resistor 66. Thus every five minutes, for approximately one second, periodic duty cycle generator 18 provides a 120–150 cycle signal on line 23. Each time the 120–150 cycle signal on line 23 goes high, the output of amplifier So goes low, the output of amplifier 82 goes high, and the output of amplifier 84 goes low, thus keeping open switch 86 and cutting off current to motor 12. During the other portion of each cycle the input to amplifier 80 is low so that its output is high, the output of amplifier 82 is low, and the output of amplifier 84 is high, thus closing switch 86 and energizing pump motor 12. During this periodic one-second interval, pump 12 is operated at approximately 30% of its full power because of the 30% duty cycle of its 120–150 cycle signal provided by duty cycle generator 18 on line 23. The pump motor is thus operated at one third power and provides a softer, quieter operation mode at start-up.

If during that one-second interval there is sufficient water present so that pump motor 12 draws a substantial amount of current, this will be reflected in the level of voltage across resistor 90 at point 92. This signal delivered on line 17 to comparator 52 is compared to the reference level provided by resistance 46, and, if the current is above a predetermined level indicating that there is sufficient water to be pumped, the output of comparator 52 goes low, causing diode 53 to be forward biased, thereby pulling down the input to amplifier 80 so that its output goes high. Thus the output of amplifier 82 goes low and the output of amplifier 84 goes high, closing switch 86 and overriding the presence and the absence of the 120–150 cycle signal on line 23: while the periodic duty cycle generator 18 continues to cycle one second on, five minutes off, the reset of the system does not respond to this action. It simply responds to the signal on line 26 and continues to pump at full power, until the water has been removed. At that point, the current drops and when the voltage at point 92 is low enough, comparator 52 will switch states so that it will have a high output, now back-biasing diode 53 and providing a high output which provides a high input to amplifier 80, causing it to have a low output so that amplifier 82 has a high output and amplifier 84 has a low output. Now switch 86 will only be turned on by the 120–150 cycle signal on line 23 for roughly 30% of the duty cycle during the one-second interval every five minutes.

Comparator 50 also responds to the voltage at point 92 indicative of the current flow through resistor 90 in pump 12. Comparator 50 responds when the voltage at point 92 is above that provided by reference circuit 28. When the output of comparator 50 then goes high, diode 51 is forward biased which charges RC timing circuit 35, which includes capacitor 99, resistor 100 and diode 102, and provides an off signal on line 32. RC timing circuit 35 prevents oscillation when over current conditions are detected. This signal on line 32 automatically provides a high input to amplifier 84, whose low output then simply turns off switch 86 and ceases all current flow to motor 12. This is done so that in the event that the pump becomes jammed or the motor is overloaded in any way the system will entirely shut down and prevent any further damage to the pump or pump motor.

A reference adjust circuit 34 uses amplifier 54 to sense when comparator 52 is representing that there is sufficient water to be pumped. In this event, anticipating that pump 12 will be operated at full power, amplifier 54 through resistor 56 connects resistor 56 in parallel with resistor 42, thereby increasing the current flow through the voltage divider of reference circuit 28 and increasing the voltage at the reference points. In this way the reference circuit 28 is shifted between a low level, when the system is operating at a 30% duty during the one-second interval every five minutes, and a high level, when the system is operating at full power at any time when comparator 52 and liquid detector 24 determine that substantial water is present and cause pump 12 to be turned on at full power.

Since the voltage $V_{cc}$ supplied to voltage divider 28 is provided directly from power supply 15, any fluctuations in the voltage supplied to pump 12 will be tracked by the voltage supplied to the voltage divider of reference circuit 28. Since the reference circuit 28 and the pump 12 are subject to the same fluctuations, there will be no errors introduced by the change in the power supply voltage. Further, the presence of reference adjust circuit 34 ensures that the difference in the two modes of operation, that is, full power invoked by comparator 52, and partial power when the system is operating under the sampling influence of duty cycle generator 18, does not cause false indications from overload detector 30. If it were not for the action of a reference adjust circuit 34, comparator 50 would respond to currents in the normal pumping range as if they were indicative of an overload condition and provide a signal to erroneously cut off power to pump 12.

While the example in this specific embodiment relates to a d.c. pump motor, similar operation can be effected with a.c. pump motors.

Although specific features of this invention are shown in some drawings and not others, this is for convenience only as some feature may be combined with any or all of the other features in accordance with the invention.

Other embodiments will occur to those skilled in the art and are within the following claims:

What is claimed is:

1. A soft-start pump control system for controlling a pump motor comprising:

switching means for supplying power to a pump motor;

a periodic duty cycle generator for periodically actuating said switching means at a fraction of the full duty cycle, to operate the pump motor at reduced power for quieter operation;

sensor means for sensing the current drawn by the pump motor;

a reference circuit; and liquid detector means for detecting the presence of liquid to be pumped, responsive to said sensor means, and said reference circuit, for overriding said periodic duty cycle generator and actuating said switching means to operate said pump motor continuously at full power when the motor current exceeds a predetermined level indicating liquid is present.

2. The soft-start pump controller system of claim 1 in which said periodic duty cycle generator includes a duty cycle generator for providing a fractional duty cycle to said switching means and a cycle timer for periodically operating said duty cycle generator.

3. The soft-start pump controller system of claim 2 in which said duty cycle generator provides a 30% duty cycle.

4. The soft-start pump controller system of claim 1 in which said liquid detector includes a comparator responsive to said reference circuit and said sensor means.

5. The soft-start pump controller system of claim 1 further including an overload detector responsive to said sensor means and said reference circuit for overriding said periodic duty cycle generator and said liquid detector to actuate said switching means to deenergize the pump motor.

6. The soft-start pump controller system of claim 1 in which said reference circuit includes a reference adjustment means, responsive to said liquid detector, for adjusting the reference level as a function of the current drawn by the pump motor under full power and at a fraction of the duty cycle.

7. A soft-start pump controller system for controlling a pump motor, comprising:

a switching device for supplying power to the pump motor;

a periodic duty cycle generator for periodically actuating said switching device at a fraction of the full duty cycle;

a current sensor for sensing the current drawn by the pump motor;

a reference circuit; and a liquid detector for detecting the presence of liquid to be pumped by the pump motor, responsive to said current sensor, and said reference circuit.

8. A soft-start pump control system for controlling a pump motor comprising:

switching means for supplying power to a pump motor;

a periodic duty cycle generator for periodically actuating said switching means at a fraction of the full duty cycle, to operate the pump motor at reduced power for quieter operation;

sensor means for sensing the current drawn by the pump motor;

a reference circuit;

liquid detector means for detecting the presence of liquid to be pumped, responsive to said sensor means, and said reference circuit, for overriding said periodic duty cycle generator and actuating said switching means to operate said pump motor continuously at full power when the motor current exceeds a predetermined level indicating liquid is present; and a reference adjustment means, responsive to said liquid detector, for adjusting the reference level of the reference circuit as a function of the current drawn by the pump motor under full power and at a fraction of the duty cycle.

* * * * *